(12) United States Patent
Coscia et al.

(10) Patent No.: US 11,021,405 B2
(45) Date of Patent: Jun. 1, 2021

(54) MOULDED INSULATION BODIES

(71) Applicant: L'Air Liquide, Societe Anonyme pour l'Etude et l'Exploitation des Procedes Georges Claude, Paris (FR)

(72) Inventors: Antonio Coscia, Hadamar (DE); Hans-Werner Scholz, Bad Nauheim (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/320,387

(22) PCT Filed: Jul. 3, 2017

(86) PCT No.: PCT/EP2017/025194
§ 371 (c)(1),
(2) Date: Jan. 24, 2019

(87) PCT Pub. No.: WO2018/019430
PCT Pub. Date: Feb. 1, 2018

(65) Prior Publication Data
US 2019/0276370 A1 Sep. 12, 2019

(30) Foreign Application Priority Data

Jul. 26, 2016 (EP) .................................... 16400031

(51) Int. Cl.
*C04B 35/80* (2006.01)
*C04B 35/64* (2006.01)
(Continued)

(52) U.S. Cl.
CPC ............. *C04B 35/803* (2013.01); *B01J 8/062* (2013.01); *B01J 8/065* (2013.01); *B01J 8/067* (2013.01);
(Continued)

(58) Field of Classification Search
CPC combination set(s) only.
See application file for complete search history.

(56) References Cited

U.S. PATENT DOCUMENTS 5,340,664 A * 8/1994 Hartvigsen ............. F28D 7/103
429/423
7,022,306 B1 * 4/2006 Oroskar .................. C01B 3/323
252/373

(Continued)

FOREIGN PATENT DOCUMENTS

DE 602 22 841 2/2008
EP 0 936 199 8/1999

OTHER PUBLICATIONS

International Search Report and Written Opinion for PCT/EP2017/025194, dated Sep. 5, 2017.

*Primary Examiner* — Kaity V Chandler
(74) *Attorney, Agent, or Firm* — Justin K. Murray

(57) ABSTRACT

Moulded insulation bodies, processes for the production thereof and use thereof consisting essentially of ceramic material comprising $SiO_2$ fibers and $Al_2O_3$ fibers which has been produced using $Al_2O_3$ sol as a binder and kilned at a temperature of above 800° C. for insulation of the ends of cracking tubes of a tubular reactor for performing a steam reforming process for generating synthesis gas which project out of the reactor heating space.

11 Claims, 3 Drawing Sheets

(51) Int. Cl.
  *B01J 8/06* (2006.01)
  *C01B 3/38* (2006.01)
  *C04B 28/00* (2006.01)
  *C04B 35/63* (2006.01)
  *C04B 35/117* (2006.01)
  *C04B 111/28* (2006.01)

(52) U.S. Cl.
  CPC ............ *C01B 3/384* (2013.01); *C04B 28/005* (2013.01); *C04B 35/117* (2013.01); *C04B 35/6303* (2013.01); *C04B 35/64* (2013.01); *B01J 2208/00132* (2013.01); *B01J 2208/00141* (2013.01); *B01J 2208/00495* (2013.01); *B01J 2208/00504* (2013.01); *B01J 2208/065* (2013.01); *C01B 2203/0233* (2013.01); *C01B 2203/0805* (2013.01); *C04B 2111/28* (2013.01); *C04B 2235/3217* (2013.01); *C04B 2235/3218* (2013.01); *C04B 2235/5224* (2013.01); *C04B 2235/5232* (2013.01); *C04B 2235/6028* (2013.01); *C04B 2235/95* (2013.01); *C04B 2235/9607* (2013.01)

(56) References Cited

U.S. PATENT DOCUMENTS

| | | |
|---|---|---|
| 8,894,919 B1 | 11/2014 | Lehman et al. |
| 8,986,598 B2 | 3/2015 | Kim et al. |
| 2002/0121309 A1 | 9/2002 | Davis et al. |
| 2004/0033882 A1 | 2/2004 | Barney et al. |
| 2009/0257925 A1 | 10/2009 | Sugino et al. |
| 2012/0269993 A1 | 10/2012 | Weeks et al. |
| 2015/0263366 A1* | 9/2015 | Shiratori ............. H01M 8/0637 429/425 |

* cited by examiner

MOULDED INSULATION BODIES

CROSS REFERENCE TO RELATED APPLICATIONS

This application is a § 371 of International PCT Application PCT/EP2017/025194, filed Jul. 3, 2017, which claims the benefit of EP16400031.7, filed Jul. 26, 2016, both of which are herein incorporated by reference in their entireties.

FIELD OF THE INVENTION

The invention relates to self-supporting moulded insulation bodies and to a process for the production thereof from a ceramic material comprising $SiO_2$ fibers and $Al_2O_3$ fibers. The invention further relates to the use thereof as insulating material in the cracking tube conduits of a tubular reactor for performing a steam reforming process.

BACKGROUND

Self-supporting moulded insulation bodies made of a ceramic material comprising $SiO_2$ fibers and $Al_2O_3$ fibers are known. They are often employed in the cracking tube conduits of a tubular reactor for performing a steam reforming process.

Such steam reforming processes and the tubular reactors employed therein are used for conversion of gaseous hydrocarbons with steam into synthesis gas consisting mainly of carbon monoxide and hydrogen. They are known per se and described in principle, for example, in Ullmann's Encyclopedia of Industrial Chemistry, Sixth Ed., Vol. 15, chapter "Gas Production", chapt. 2.2. These tubular reactors consist essentially of a heating space through which numerous so-called cracking tubes are vertically passed and heated. The cracking tubes are filled with a catalyst active for the reforming reactions in the form of a fixed bed. The process gases, i.e. the reactant and product gases for the steam reforming process, are passed through the cracking tubes. The ends of the cracking tubes project from the heating space of the tubular reactor at the top and bottom for example and are often provided with an insulation to prevent heat losses and burns to operators.

Insulating materials employed are often $SiO_2$- and $Al_2O_3$-based fibre materials present as tapes or mats, and fitting and disassembly of the insulation is therefore complex and inconvenient. It would be more convenient to use dimensionally stable moulded insulation bodies that are easier to install and deinstall, have a sufficient service life and may optionally be reused. Such moulded insulation bodies shall especially also be employed in an insulation inside the cracking tube, i.e. as internal insulation, to protect the inner surface of the plant parts from temperatures which promote so-called metal dusting corrosion.

The use of the binder plays an important role in connection with a sufficient service life. It has been found in practice that when using an $SiO_2$-containing and/or an organic binder the thus manufactured insulation bodies achieve only inadequate service lives under the process conditions of steam reforming. Due to the high process temperatures to which the insulation is subjected and the high steam content in the process gas these hitherto used binders are expelled from the ceramic material causing it to lose its stability and disintegrate.

The patent specification U.S. Pat. No. 8,986,598 B2 describes a process for producing a moulded body from a refractory spinel-SiC composite material. This process uses an $Al_2O_3$ sol as a binder. The components involved are atypical insulation media for steam reforming.

The patent publication DE 602 22 841 T2 describes the production of a shaped ceramic matrix composite part wherein the matrix consists of a colloidal suspension of a metal oxide, for example aluminium oxide, into which aluminium oxide particles are blended. Volatile components are then removed by applying a vacuum and kilning at temperatures between 815° C. and 1260° C.

Neither publication addresses the use of proven fibre materials based on SiO2 and Al2O3 and the use thereof for producing self-supporting longterm-stable moulded insulation bodies for use in steam reforming plants.

The problem addressed by certain embodiments of the invention was therefore that of providing an insulation material/moulded insulation bodies for the steam reforming process, which achieve a longer service life and comprise commonly used constituents.

SUMMARY OF THE INVENTION

The object was achieved by a process for producing self-supporting moulded insulation bodies from a ceramic material comprising $SiO_2$ fibers and $Al_2O_3$ fibers, by the moulded insulation bodies obtained, by the use thereof as insulation material in cracking tubes of a tubular reactor for performing a steam reforming process for generating synthesis gas, and by a process according for fitting a cracking tube with at least one moulded insulation body as described herein.

The motivation for using an $Al_2O_3$ sol as a binder for the production of self-supporting moulded insulation bodies from a ceramic material comprising $SiO_2$ fibers and $Al_2O_3$ fibers was taken from the abovementioned patent specifications U.S. Pat. No. 8,986,598 B2 und DE 602 22 841 T2. The service life of the mouldings used for the internal insulation of the cracking tubes was improved through use of this binder.

The production of the moulded insulation bodies may be made more effective by performing process steps under vacuum conditions.

PREFERRED EMBODIMENTS OF THE INVENTION

A preferred embodiment of the invention is characterized in that the moulded insulation bodies are provided with a circular arc profile, preferably in the shape of a half shell or quarter shell, or are cylindrical. This enables/facilitates introduction and placement of the bodies at the locations in the cracking tubes intended for insulation.

A further preferred embodiment of the use of the moulded insulation bodies is characterized in that the inlet for the reactants and the outlet for the products are arranged at opposite ends of the cracking tube which project out of the heating space of the tubular reactor, wherein the inlet region and/or the outlet region of the cracking tube are fitted with internal moulded insulation bodies having a circular arc profile. This embodiment has the advantage that the ends of the cracking tubes are readily accessible as a result of projecting from the heating space. However, to protect maintenance personnel against burns and to avoid unnecessary heat losses, a particularly good insulation of these tube ends is also required and is ensured by use of the moulded insulation bodies.

A further preferred embodiment of the use of the moulded insulation bodies is characterized in that the inlet for the reactants and the outlet for the products are arranged at the same end of the cracking tube which projects out of the heating space of the tubular reactor and in that at the opposite end of the cracking tube a free interior space is present which serves to deflect the gas flow leaving the catalyst bed into a heat exchanger tube arranged inside the catalyst bed, wherein the Inlet region and/or the outlet region of the cracking tube are fitted with internal moulded insulation bodies having a circular arc profile and the free interior space is fitted with an internal moulded insulation body which is cylindrical. This embodiment too has the advantage that the ends of the cracking tubes are readily accessible as a result of projecting from the heating space. Said ends must likewise be well insulated for protection of maintenance personnel against burns and for avoidance of unnecessary heat losses and this can be ensured by use of the moulded insulation bodies.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims the way in which said claims refer back to one another.

The invention shall be more particularly elucidated with reference to the drawing.

DETAILED DESCRIPTION OF THE INVENTION

Figure 1:
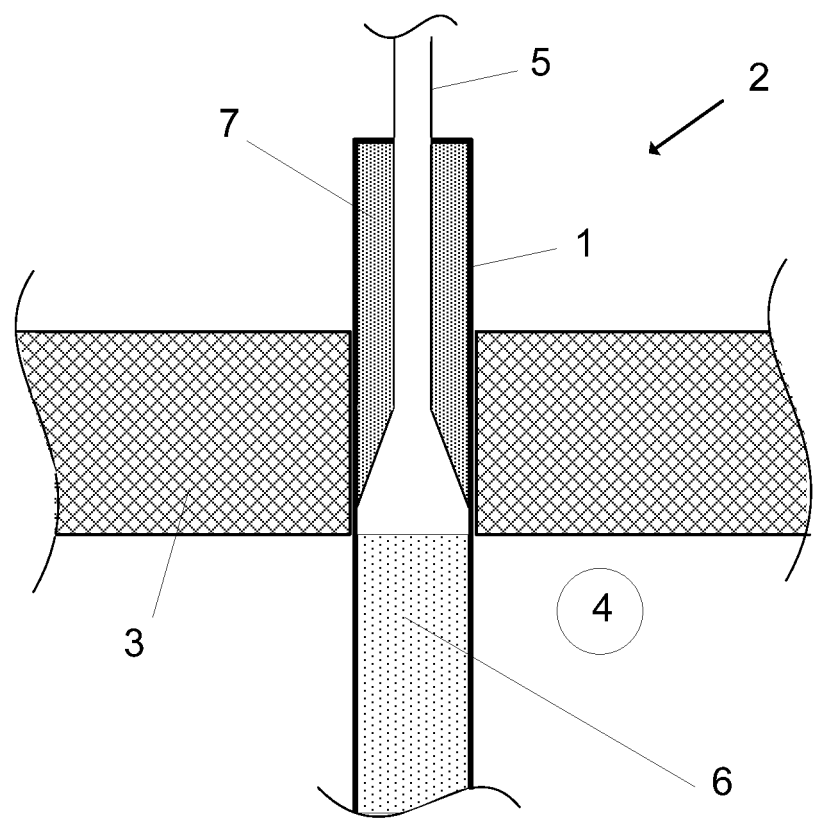
FIG. 1 shows a cross section of the upper end of a cracking tube which passes through the ceiling of the heating space of a tubular reactor.

In FIG. 1 the upper end 1 of a cracking tube 2 projects through the ceiling 3 of the heating space 4. The cracking tube 2 is not firmly connected to the ceiling 3 in order that the thermal expansion of the cracking tube 2 may be compensated by it growing out of the ceiling 3. A thin-walled, flexible tube 5 connects the upper end 1 of the cracking tube 2 with a distributor tube (not shown) from which the reactant gas is introduced into the cracking tube 2. The reactant gas is conducted through the catalyst fixed bed 6 through the cracking tube 2 to its lower end (not shown). The upper end 1 of the cracking tube 2 is provided with the internal moulded insulation body 7 consisting of the ceramic material according to the invention.

Figure 2:
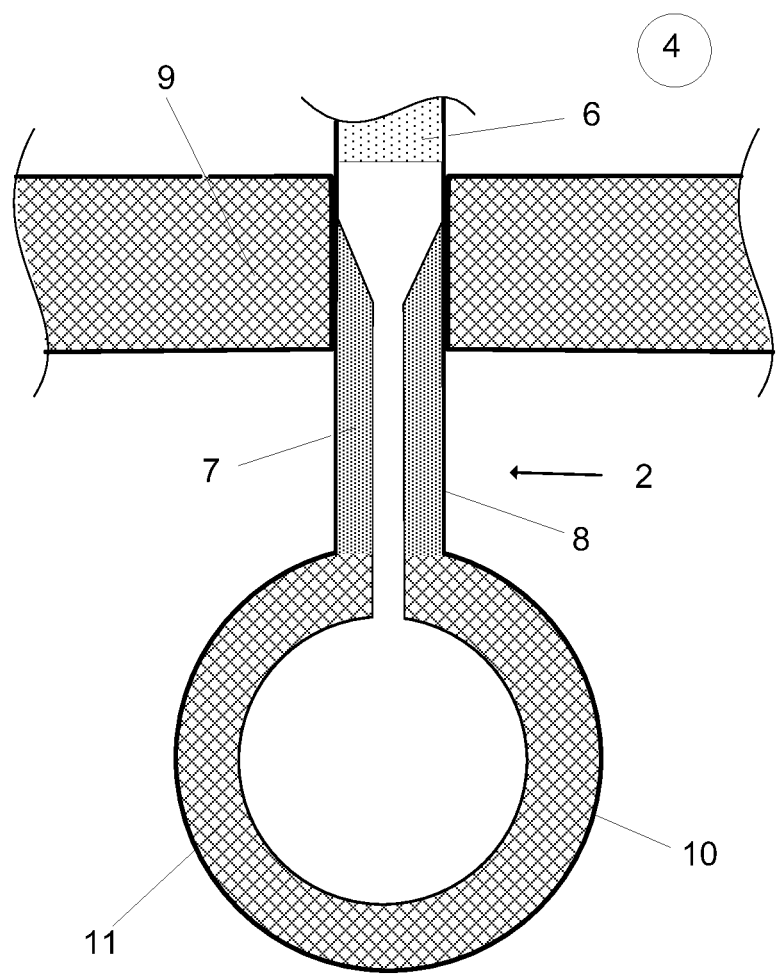
FIG. 2 shows a cross section of the lower end of a cracking tube which passes through the floor of the heating space of a tubular reactor.

FIG. 2 depicts by way of example how the lower end 8 of a cracking tube 2 is passed through the floor 9 of a heating space 4. The product gas emerges from the catalyst bed 6 and is introduced into the collection conduit 10. The collection conduit 10 is provided with an internal insulation 11. The lower end 8 of the cracking tube 2 is provided with the internal moulded insulation body 7 consisting of the ceramic material according to the invention.

Figure 3:
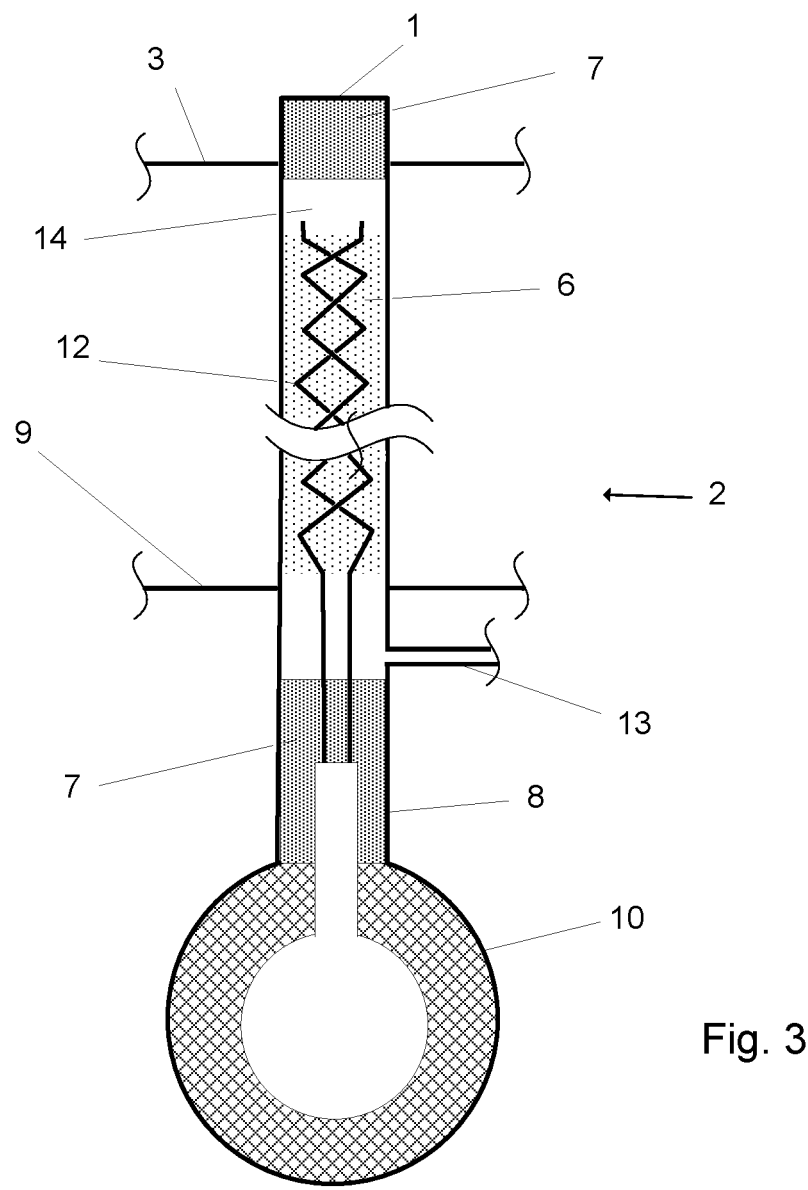
FIG. 3 shows a cross section of a cracking tube having an internal heat exchanger.

FIG. 3 shows how a cracking tube 2 having an internal heat exchanger 12 projects with its upper end 1 from the ceiling 3 of the heating space 4 and with its lower end 8 from the floor 9 of the heating space 4. The feed for the reactant gas 13 through which the gas is introduced into the cracking tube 2 is also shown. The gas then ascends through the catalyst fixed bed 6 in the cracking tube 2 into the turn-around space 14 and flows from there through the heat exchanger tubes 12 into the collection conduit 10 for the product gas. The upper end 1 and the lower end 8 of the cracking tube 2 are provided with the internal moulded insulation body 7 consisting of the ceramic material according to the invention.

INDUSTRIAL APPLICABILITY

The invention makes it possible to achieve higher service lives of the cracking tubes and accordingly improved economy of the steam reforming process. The invention is therefore advantageously economically employable.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 upper end of a cracking tube
2 cracking tube
3 ceiling of a heating space of a tubular reactor
4 heating space of a tubular reactor
5 flexible tube
6 catalyst fixed bed 7 moulded insulation body
8 lower end of a cracking tube
9 floor of a heating space of a tubular reactor
10 collection conduit for product gas
11 collection conduit insulation
12 heat exchanger tubes
13 feed for reactant gas
14 turnaround space for gas flow inside the cracking tube

The invention claimed is:

1. A cracking tube for use in a tubular reactor, the cracking tube comprising a top portion configured to be at least partially disposed above a ceiling of the tubular reactor, a bottom portion configured to be at least partially disposed below a floor of the tubular reactor, and a middle portion configured to be disposed within a heating space of the tubular reactor, wherein the cracking tube further comprises:
   a catalyst bed disposed in the middle portion, wherein the catalyst bed is configured to convert a reactant gas stream comprising hydrocarbons and steam into synthesis gas,
   a first internal molded insulation body disposed in the top portion of the cracking tube, wherein the first internal molded insulation body is produced from a ceramic material comprising $SiO_2$ fibers and $Al_2O_3$ fibers using a process comprising the steps of:
      a. providing a flowable mixture comprising $SiO_2$ fibers and $Al_2O_3$ fibers and a binder comprised of an $Al_2O_3$ sol;
      b. producing a preform by filling the flowable mixture into a hollow mold;
      c. kilning the preform at a temperature of at least 800° C.; and
   a second internal molded insulation body disposed in the bottom portion of the cracking tube.

2. A cracking tube for use in a tubular reactor, the cracking tube comprising a top portion configured to be at least partially disposed above a ceiling of the tubular reactor, a bottom portion configured to be at least partially disposed below a floor of the tubular reactor, and a middle portion configured to be disposed within a heating space of the tubular reactor, wherein the cracking tube further comprises:
   a catalyst bed disposed in the middle portion, wherein the catalyst bed is configured to convert a reactant gas stream comprising hydrocarbons and steam into synthesis gas,
   an internal molded insulation body disposed in a portion of the cracking tube selected from the group consisting of the top portion, the bottom portion, and combinations thereof, wherein the internal molded insulation body is produced from a ceramic material comprising $SiO_2$ fibers and $Al_2O_3$ fibers using a process comprising the steps of:
      a. providing a flowable mixture comprising $SiO_2$ fibers and $Al_2O_3$ fibers and a binder comprised of an $Al_2O_3$ sol;
      b. producing a preform by filling the flowable mixture into a hollow mold; and
      c. kilning the preform at a temperature of at least 800° C.; and
   an inlet for reactants and an outlet for products, wherein the inlet and the outlet are disposed within a section of the cracking tube selected from the group consisting of the top portion, the bottom portion, and combinations thereof.

3. The cracking tube according to claim 2, wherein the inlet and the outlet are arranged at opposite ends of the cracking tube which project out of the heating space of the tubular reactor.

4. The cracking tube according to claim 2, wherein the inlet and the outlet are arranged at a same end of the cracking tube which projects out of the heating space of the tubular reactor and in that at an opposite end of the cracking tube a free interior space is present which serves to deflect a gas flow leaving the catalyst bed into a heat exchanger tube arranged inside the catalyst bed.

5. The cracking tube according to claim 2, wherein the molded insulation body has a circular arc profile.

6. The cracking tube according to claim 2, wherein the molded insulation body is in a shape selected from the group consisting of a half shell, a quarter shell, and cylindrical.

7. A process for performing a steam reforming process for generating synthesis gas, the process comprising the steps of:
   providing a tubular reactor having the cracking tube as claimed in claim 2;
   flowing a reactant gas comprising hydrocarbons and steam into an inlet of the cracking tube to generate the synthesis gas; and
   collecting the synthesis gas from an outlet of the cracking tube.

8. The process according to claim 7, wherein the inlet and the outlet are arranged at opposite ends of the cracking tube which project out of a heating space of the tubular reactor.

9. The process according to claim 7, wherein the inlet and the outlet are arranged at a same end of the cracking tube which projects out of the heating space of the tubular reactor and in that at an opposite end of the cracking tube a free interior space is present which serves to deflect the gas flow leaving the catalyst bed into a heat exchanger tube arranged inside the catalyst bed.

10. The process according to claim 7, wherein the molded insulation body has a circular arc profile.

11. The process according to claim 7, wherein the molded insulation body is in a shape selected from the group consisting of a half shell, a quarter shell, and cylindrical.

* * * * *